(12) United States Patent
Adams et al.

(10) Patent No.: US 9,129,062 B1
(45) Date of Patent: Sep. 8, 2015

(54) INTERCEPTING SUBROUTINE RETURN IN UNMODIFIED BINARIES

(75) Inventors: Keith Adams, San Carlos, CA (US); Eli Daniel Collins, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 1221 days.

(21) Appl. No.: 12/784,315

(22) Filed: May 20, 2010

(51) Int. Cl.
*G06F 9/44* (2006.01)
*G06F 11/36* (2006.01)

(52) U.S. Cl.
CPC .................................. *G06F 11/3644* (2013.01)

(58) Field of Classification Search
CPC .................................................... G06F 11/3644
USPC ......................................................... 717/130
See application file for complete search history.

(56) References Cited

U.S. PATENT DOCUMENTS

| | | | |
|---|---|---|---|
| 6,175,916 B1 * | 1/2001 | Ginsberg et al. | 712/228 |
| 7,555,747 B1 | 6/2009 | Agesen et al. | |
| 7,774,172 B1 * | 8/2010 | Yunt et al. | 703/2 |
| 8,327,438 B2 * | 12/2012 | Hwang et al. | 726/22 |

* cited by examiner

*Primary Examiner* — Wei Zhen
*Assistant Examiner* — Lanny Ung (57) ABSTRACT

Systems and methods for instrumenting code are disclosed. The entry to a subroutine is trapped and the subroutine's return address is mutated to create an invalid instruction pointer. The mutated return address is stored in the architecture reserved space for the return address. An exception handler is executed that has been instrumented to handle the fault caused by the mutated return address such that the exit from the subroutine is instrumented.

19 Claims, 9 Drawing Sheets

| | |
|---|---|
| $R'_1$ | $R_1$ |
| $R'_2$ | $R_2$ |
| $R'_3$ | $R_3$ |
| $R'_4$ | $R_4$ |
| . | . |
| . | . |
| . | . |
| . | . |
| . | . |
| . | . |
| . | . |
| . | . |
| . | . |
| $R'_n$ | $R_n$ |

INTERCEPTING SUBROUTINE RETURN IN UNMODIFIED BINARIES

BACKGROUND

Code Instrumentation

In the field of computer science, instrumenting code refers to placing additional instructions in code, which can be used, for example, to monitor the code or for adding additional functionality. Instrumenting code allows for additional software to take control of the program and monitor it during runtime to determine what the computer is actually doing while the program is executing. The program being monitored may be referred to as the target program, and the additional software may be referred to as the controlling program or meta-program. When code is instrumented, transferring control during execution of the target program to the instrumented code at a particular instruction in the target program is referred to as "trapping" that instruction.

Examples of uses for instrumenting code include, but are not limited to, measuring the level of performance for a piece of software, diagnosing errors, and receiving messages about the execution of an application at run time. Examples of controlling programs include, but are not limited to, tracing infrastructures, debuggers, profilers and virtual machine monitors.

Subroutines and Subroutine Calls

In the field of computer science, a subroutine (also called procedure, subprogram, method, function, or routine) is a portion of code within a larger program which performs a task and may be relatively independent of the remaining code. To simplify the process of programming a large software system, the system is structured as a set of smaller sub-problems. Subroutines are programmed to solve these sub-problems. Examples of subroutines include, but are not limited to, reading from a file, testing for the presence of an entry in a cache, and computing a particular mathematical function on its inputs.

A subroutine comprises a number of program statements (and optionally data structures) to perform the specific task assigned to the subroutine. Large software systems are organized as collections of subroutines. Subroutines allow for code reuse; i.e. once a solution to a sub-problem has been implemented and made available as a subroutine, the subroutine can be used as a building block for solving many different problems. Because each subroutine contains or "encapsulates" the individual statements comprising it, the entire subroutine may be invoked or "called" from elsewhere in the program. The part of code which calls the subroutine is referred to as the "caller." When a subroutine has been called, the encapsulated statements are executed, and when the last such statement completes, the program continues executing from the point in the program where the subroutine was invoked, i.e., the instruction in the caller following the instruction to call the subroutine. The address where this next instruction is located in computer memory is referred to as the return address for the subroutine. The return address of a subroutine is a type of instruction pointer. An instruction pointer is the location or "addresses" in computer memory of an instruction.

Programs are generally written in high-level programming languages, such as C, C++, or Java, which can be easily understood by programmers. The code written in these languages is referred to as source code. All of these languages provide subroutines in some form, and while the details vary in terms of both syntax and semantics, there are many similarities. For example, all languages include a "return from subroutine" statement.

Because of the frequent use of subroutines in computer programs, instruction set architectures provide explicit support for calling a subroutine and returning from the subroutine through specialized call and return instructions. Architectures also impose an application binary interface, or ABI, which establishes conventions for locating the inputs and outputs to subroutines. ABIs enable dynamic linking, i.e., dynamically calling external subroutines during program execution; programming development across different languages; and debugging tools. ABIs cover details such as the calling convention, which controls how subroutines' arguments are passed and return values retrieved. The ABI general purpose CPU architectures provide a linking convention for specifying the return address of a subroutine, such as reserving a space in memory for the return address.

As discussed above, the return address is the location in the code of the instruction following the instruction to call the subroutine. One example of reserving space in memory for the return address includes placing the return address in a specific register when a subroutine is called, as is done in the MIPS architecture and the DEC Alpha architecture. A "register" is a small amount of storage available on the CPU whose contents can be accessed more quickly than storage available elsewhere. In MIPS the register where the return address is placed is referred to as the $ra register.

Figure 1A:
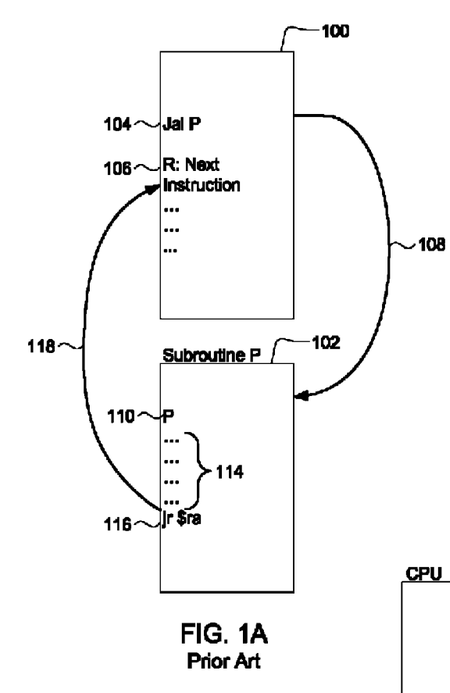
FIG. 1A is a diagram illustrating a subroutine call in an architecture that places the return address in a specific register when a subroutine is called.
Figure 1B:
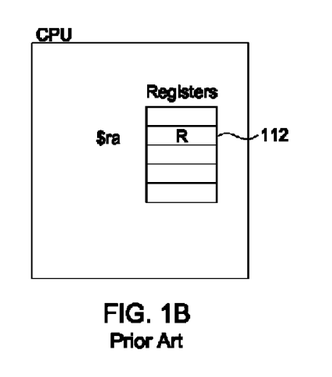
FIG. 1B is a diagram illustrating the $ra register used in the MIPS instruction set to store the return address for a subroutine.

FIG. 1A is a diagram illustrating a subroutine call in an architecture that places the return address in a specific register when a subroutine is called. For purposes of illustrating a call to a subroutine, the diagram shows the process of calling a subroutine denoted as "P." The MIPS implementation is illustrated as an example, but is not meant to be limiting in any way, and it is well understood in the field of computer science how to specify the return address of a subroutine in different architectures using a specific register. FIG. 1B is a diagram illustrating the $ra register used in the MIPS architecture to store the return address for a subroutine. MIPS assembly language includes an instruction for calling a subroutine, the "jal" or jump and link instruction. As illustrated in FIG. 1A, when the jal P is called at 104, the program jumps to the subroutine 102 named P at 108, i.e., the CPU starts executing the first instruction of P 110, and simultaneously stores the address of the following instruction, "R" in register $ra as illustrated at 112 in FIG. 1B.

In MIPS, once P has finished executing its instructions, which are illustrated by the doted lines at 114 of FIG. 1A, the instruction jr $ra is called at 116. This instruction will cause the CPU to jump to the address in the $ra register 112 of FIG. 1B, which as explained above is the return address, or the address of the instruction after the instruction to call P. Thus, when jr $ra is called, the program "jumps" to the instruction 106 after the instruction to call P as illustrated at 118 (i.e., the CPU begins executing that instruction), and continues executing the caller 100 of P.

Another convention for storing the return address is to place the return address in the architecture's in-memory stack when the subroutine is called. The stack is usually implemented as a contiguous area of memory with a pointer to the top of the stack. In some architectures, the top of the stack is the lowest address in use within the area and the stack will grow downwards in memory. In other architectures, the top of the stack is the highest address in use within this area, and the stack will grow upwards in memory. It is an arbitrary design choice whether the top of the stack is the lowest or highest address within this area, but the common convention is for the stack to grow downwards in memory. Examples of architectures using stacks to store the return address include x86, x86-64, and the Power architectures.

Figure 2A:
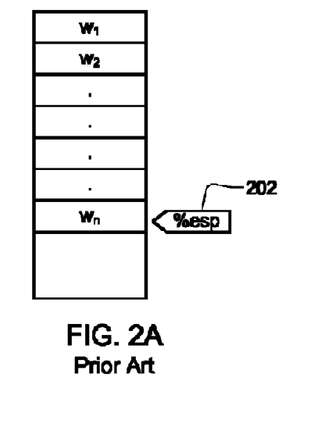
FIG. 2A is a diagram illustrating the contents of a stack before a call to a subroutine.
Figure 2B:
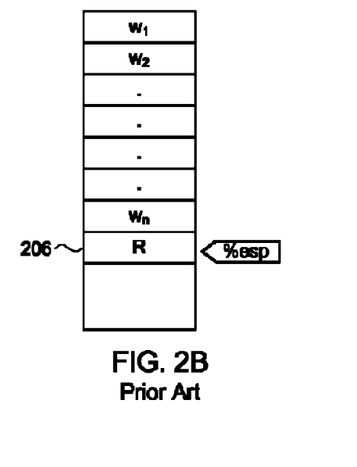
FIG. 2B is a diagram illustrating the contents of the stack after execution of the call instruction.

Below is an example illustrating the process of using the stack to specifying the return address of a subroutine. The particular architecture illustrated is the x86 architecture. However, the example is provided for illustrative reasons, and it is well understood in the field of computer science how to specify the return address of a subroutine using a stack in different architectures. FIG. 2A is a diagram illustrating the contents of a stack before a call to a subroutine. % esp 202 denotes the top of stack pointer which indicates the current top of the stack. The $w_n$ denotes that it would contain some word of memory. FIG. 2B is a diagram illustrating the contents of the stack after execution of the call instruction.

The x86 architecture includes assembly language instructions for calling a subroutine. An example of calling a subroutine denoted as "P" is illustrated in TABLE 1.

TABLE 1

| Call P | //call the subroutine that begins at address S |
|---|---|
| R <some instruction>; | //the next instruction following the call is at address R. |

Figure 2C:
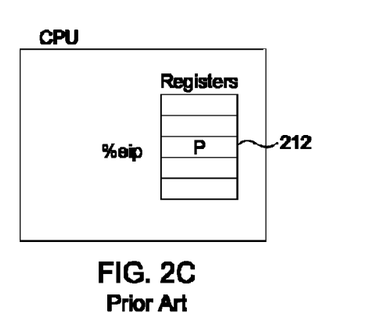
FIG. 2C is a diagram illustrating the program counter register in the x86 platform after the call to a subroutine.

When executed, this call instruction will (1) "push," i.e., place, onto the memory stack the address, "R", of instruction following the instruction to call P as illustrated at 206 of FIG. 2B. The call instruction will also (2) set the program counter (PC), which on the x86 platform is named % eip, to the address P as illustrated at 212 of FIG. 2C. The program counter is the register containing the address of the instruction in the program that is executing.

Figure 2D:
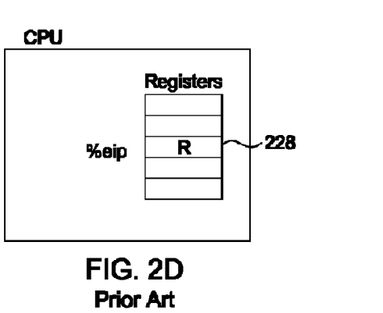
FIG. 2D is a diagram illustrating the program counter register in the x86 platform after the return from a subroutine.

Now the subroutine that begins at address P executes. The subroutine may make use of the stack to hold temporary data or make further calls, thereby pushing more items onto the stack. When the subroutine that began at address P has completed and is ready to return, the stack must have returned to the state illustrated in FIG. 2B. To return, the subroutine P executes a return instruction as illustrated below in Table 2. This will "pop," the topmost element from the stack and place it in the program counter, referred to as % eip. Thus, when Ret is called, it will set the program counter % eip equal to R, the return address, as illustrated at 228 of FIG. 2D. This will cause the CPU to begin executing the instruction at address R, i.e., the instruction following the instruction to call P The instruction will also update the top of stack pointer register so that the stack contents will return to the pre-call state as illustrated in FIG. 2A.

TABLE 2

| Ret: | // return to the caller of this subroutine. |
|---|---|

Once source code for a program has been written, the source code is compiled into machine-readable object code, also referred to as machine code, which can be understood by the computer. Object code is in the form of 1's and 0's. Subroutines which are created in human readable source code, are visible to the machine in readable object code once the source code has been compiled. Thus, information presented in terms of subroutines is both meaningful to humans, and machine-visible, which makes monitoring subroutines during runtime useful for a variety of reasons. For example, debuggers may stop the program for inspection at entry to or return from a given subroutine. Additionally, tracing infrastructures can record the value returned from the subroutine.

It is well understood in the field of computer science that there are a variety of other reasons that it would be useful to monitor the entry to and return from a subroutine during runtime. Therefore, it would be useful to have a way to instrument the entry and return from a subroutine so that the subroutine may be monitored during runtime.

As is understood in the field of computer software, instrumenting and trapping the entry into a subroutine is straightforward because in typical high-level languages, subroutines are entered through a single instruction pointer. In other words, there is one instruction that is executed at the start of the subroutine, and the CPU jumps to that instruction every time the subroutine is called. Thus, the entry to the subroutine can be trapped by instrumenting the code to trap that instruction pointer.

Additionally, some architectures, such as the x86 and x86-64 architectures, offer debug registers which can be programmed to trap on execution of a particular physical or virtual address.

Trapping the return from a subroutine, however, presents special problems. For example, it is not feasible to decode forward in the instruction stream from entry to the subroutine to find the subroutine's return instruction for several reasons. A single subroutine may be compiled so that it contains multiple returns, making it difficult to determine at what instruction the subroutine will return to its caller during runtime. Therefore, it cannot be known before the subroutine is running when to stop scanning. Additionally, subroutines often contain branches, such as if then statements, that result in the subroutine executing different sections of code at run time. Thus, discovering the actual body of the subroutine that will run at a particular time is impossible before the subroutine is actually running Further, often when a code is compiled, the compiler will include read-only data interspersed with the subroutine's instructions. This data might look like return instructions and determining at run time what is a return instruction and what is data may be undecideable. Also, the compiler might not use, or the architecture may not provide a special instruction for returning from subroutines. The compiler might choose to instead implement subroutines with a memory or register indirect branch. For example, as described above, the MIPS architecture implements returns from subroutines with ordinary register-indirect control transfers.

It would be useful to have a means for trapping the exit to a subroutine. In particular, it would be useful to have a means for dynamically instrumenting the return from a subroutine in binaries, i.e., after the code has been compiled.

SUMMARY

A system and method for instrumenting code is disclosed. Upon entry to a subroutine, the return address of the subroutine is mutated such that it becomes an invalid instruction pointer. The mutated return address is stored as the return address. When the subroutine attempts to return control to the caller, the mutated return address causes a fault and an exception handler is called. The exception handler has been instrumented such that once it is called, it instruments the exit from the subroutine, determines the correct return address, and restores the correct return address. Control then returns to the caller of the subroutine.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 3:
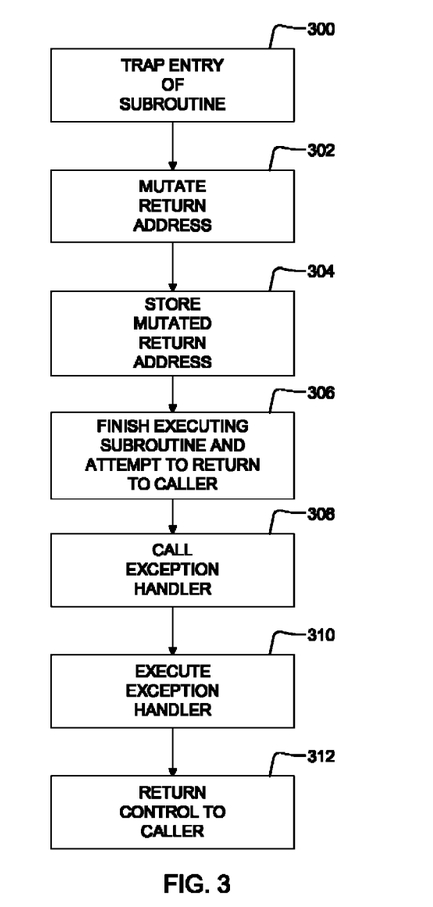
FIG. 3 is a flow chart for instrumenting the entry and exit from a subroutine.

FIG. 3 is a flow chart for instrumenting the exit from a subroutine. At step 300 the entry to the subroutine is trapped. As discussed above, trapping the entry to a subroutine is well understood in the field of computer science, and may be performed a variety of ways depending on the architecture. The entry to the subroutine may be instrumented statically before the program is executed.

At step 302 the return address of the subroutine is mutated. In any system in which the return address is readable and writable at the entry to a subroutine, instrumenting code may be added which will read the return address at entry to the subroutine, mutate it, and store the mutated address in the place for specifying the return address, regardless of how the return addresses are encoded. In other words, in any system in which the return address is readable and writable at entry to the subroutine, code may be inserted statically to mutate the return address. The entry to the subroutine may be instrumented to mutate the return address statically before the program is executed. In some embodiments, the entry to subroutines may be instrumented permanently to mutate the return address in a particular way.

As explained above in the background section, the return address is a type of instruction pointer. Instruction set architectures specify certain locations in memory that are valid addresses for instructions. Valid instruction pointers comply with these specifications. An instruction pointer that does not comply with these is referred to as an invalid instruction pointer. In step 302, the return address is mutated such that it becomes an invalid instruction pointer. When the CPU attempts to access an instruction with an invalid instruction pointer, a fault occurs and an exception handler will be called as discussed below in regard to steps 308 and 310. Exception handlers are specific subroutines that handle the occurrence of exceptions, such as faults, which are special conditions that change the normal flow of program execution. When the computer is executing, faults occur to signal that the program is not following a particular format or rule. When a fault occurs, an exception handler is initiated, which may be referred to as "throwing" an exception. For example, when a CPU attempts to access an instruction with an invalid instruction pointer, a fault will occur, and an exception handler for handling the invalid instruction pointer will be called. Exception handlers resolve a fault by saving the current state of execution in a predefined place and switching the execution to the specific subroutine for handling the fault. The exception handler may later resume the execution of the program at the original location using the stored information. As is well known in the field of computer science, exception handlers may be programmed to handle specific types of exceptions in a particular way.

Figure 4A:
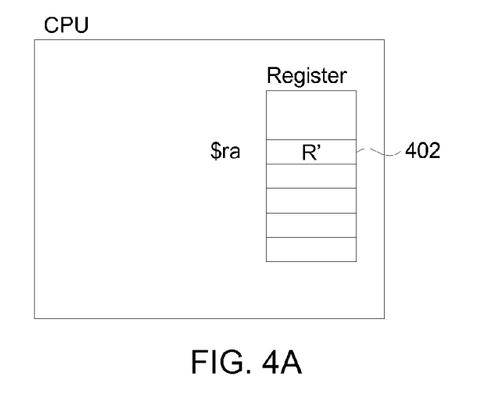
FIG. 4A is a diagram illustrating storing the mutated return address, R' in the $ra register in the MIPS architecture.
Figure 4B:
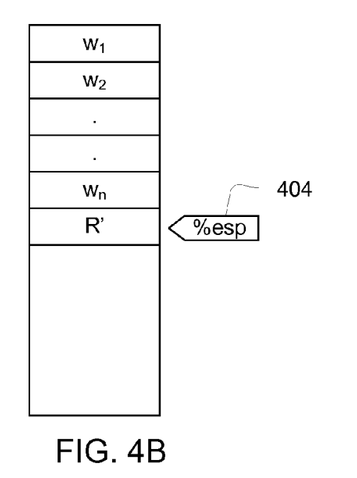
FIG. 4B is a diagram illustrating storing the mutated return address R' in the top of the architecture stack.

At step 304 the mutated return address is stored in the place for the return address. As discussed above, each architecture instruction set has a specified place for saving the return address. For example, in a MIPS architecture this step would thus include saving the mutated address R' in the $ra register. FIG. 4A is a diagram illustrating storing the mutated return address, R' in the $ra register 402 in the MIPS architecture. In another example, on the x86 and x86-64 architectures, the mutated return address would be stored at the top of the architecture's in-memory stack. FIG. 4B is a diagram illustrating saving the mutated return address R' in the top of the architecture stack 404. FIGS. 4A and 4B are provided to illustrate examples of storing the mutated return address, and are not meant to be limiting in any way. As is well understood in the field of computer science, step 304 would not be limited to a particular architecture set or place for storing the return address or other mechanism whereby the return address is encoded, and could be performed on any architecture as long as the return address is readable and writable at entry to the subroutine.

Figure 4C:
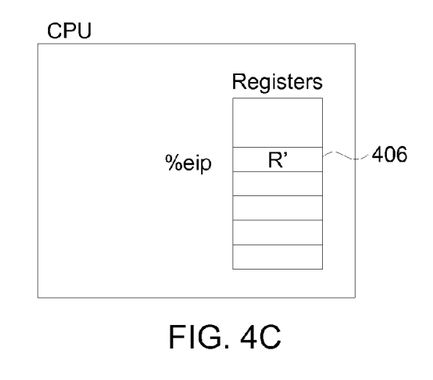
FIG. 4C is a diagram illustrating the program counter register in the x86 architecture with the mutated return address R'.

At step 306 the subroutine finishes execution and the system attempts to return control to the caller. For example, in the MIPS architecture, the jr $ra instruction would be called with the mutated address/invalid instruction pointer R' in the $ra register as illustrated at 402 of FIG. 4A. As another example, in the x86 architecture the Ret instruction would be called, which would pop R' off the stack and set the program counter to the mutated address/invalid instruction pointer R' as illustrated at 406 of FIG. 4C. These examples are illustrative, and not meant to be limiting in any way. It is well understood in the field of computer science how step 306 would be implemented in other architectures. Because the mutated return address R' is an invalid instruction pointer, a fault occurs and the exception handler for handling an invalid instruction pointer is called as illustrated at step 308.

The exception handler that is called at step 308 when the CPU attempts to access an instruction with an invalid instruction pointer is an exception handler that has been instrumented so that it will instrument the return from the subroutine. The exception handler for handling the fault may be instrumented statically before the program executes.

Figure 5:
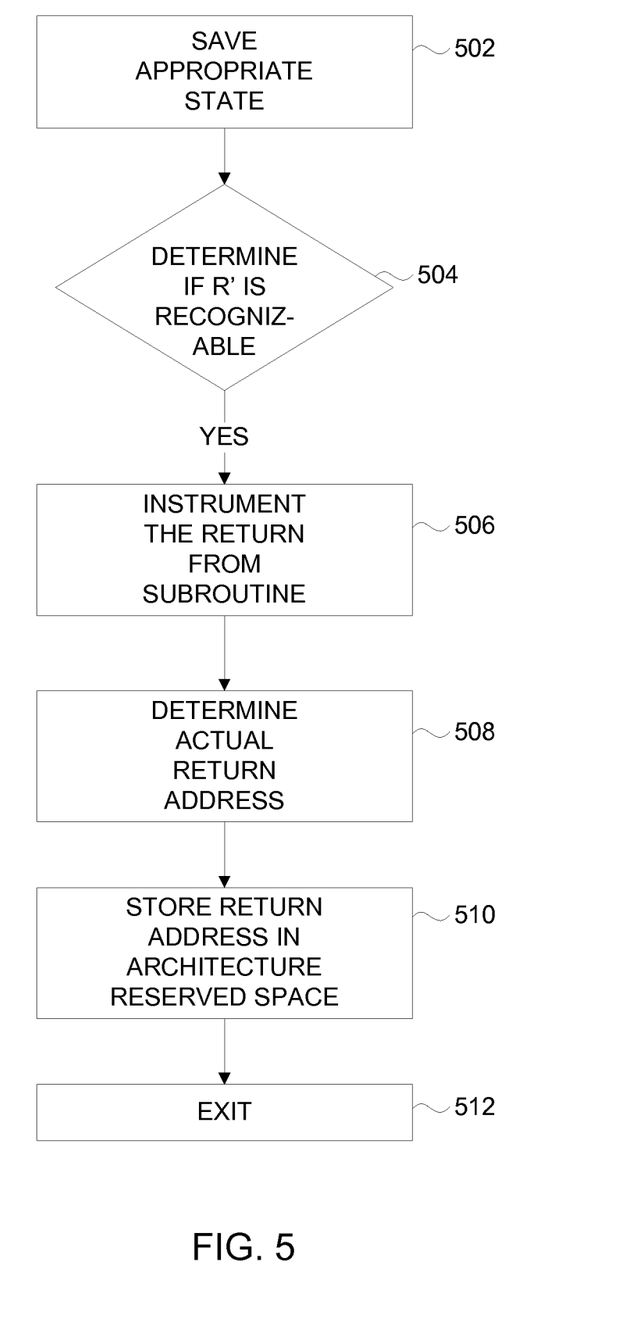
FIG. 5 is a flow chart further illustrating step 310 of FIG. 3.

At step 310, the exception handler executes and the exit of the subroutine is instrumented by the exception handler. FIG. 5 is a flow chart illustrating in further detail step 310 of FIG. 3. At 502 the exception handler saves any appropriate state so that the system can return to the appropriate place when the exception handler has finished executing. At 504 the exception handler determines if the invalid instruction pointer R' is recognizable as a mutated return address of the type mutated in step 302 of FIG. 3, so that the return from the subroutine should be instrumented. If R' is recognized as a mutated return address, the exception handler instruments the return from the subroutine by running the required instrumentation code at 506. A person of skill in the art, especially in view of existing literature related to instrumenting code, will understand numerous methods for instrumenting the return from the subroutine to achieve numerous different results. Once the return from the subroutine has been instrumented, the exception handler determines the actual return address for the subroutine at step 508, and places the actual return address R in the architecture reserved space for return addresses at step 510. As an example, in step 510, in the MIPS architecture, R will be placed in $ra. As another example, in step 510, in the x86, architecture R would be place in the top of the stack. Again, these examples are described for illustrative purposes and are not meant to be limiting in any way. The exception handler then finishes executing and exits. At step 312 of FIG. 3, control is returned to the calling subroutine at the return address.

By mutating the return address of a subroutine so that an exception handler that has been instrumented to trap the return from the subroutine when it is called, the exit from a subroutine may be instrumented from its binary form without having to recompile the program. Additionally, subroutines that were not written by the programmer, such as subroutines linked in from libraries may be instrumented while the program is running. Since the technique operates at the level of program binaries it does not matter whether the subroutines are part of an application program, libraries, or the operating system itself.

Figure 6:
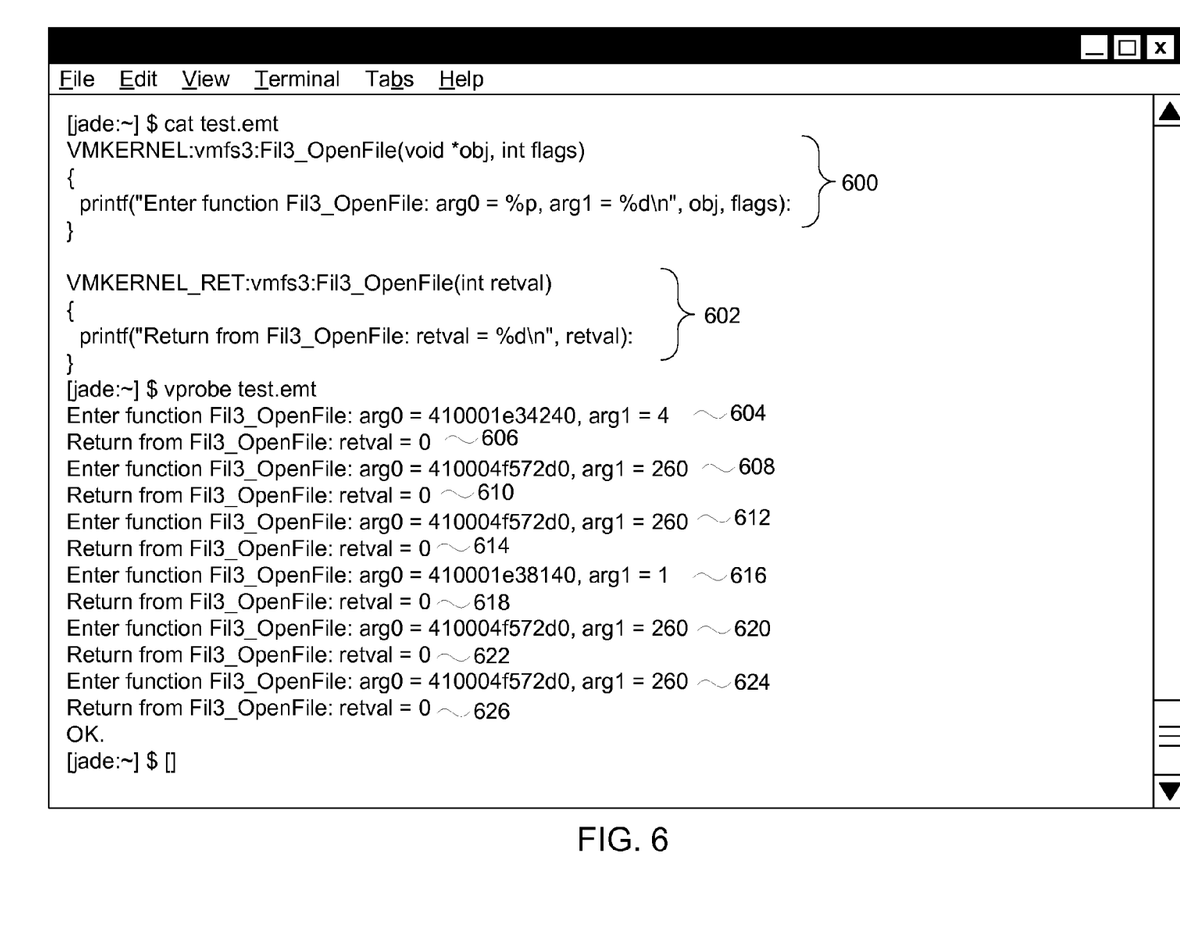
FIG. 6 is an example of a print out from instrumented code.

In some embodiments, the instrumented code may be programmed to output information about the subroutine based on trapping its entry and exit so that it may be reviewed by the programmer or other human interested in knowing what the computer is actually doing as it is running Examples of the type of information that would be useful to review include, but are not limited to, the fact that the subroutine was called (e.g., for tracing which system calls are made), performance metrics for the subroutine, the data the subroutine accesses, other subroutines it calls, and the values of its variables upon entry and exit. FIG. 6 is an example of a print out from instrumented code. As illustrated at 600 and 602, the Fil3_OpenFile subroutine is instrumented so that upon entry, the value of arg0 and arg1 will be printed, and upon exit, the value of retval will be printed. Example printouts upon entry are shown at 604, 608, 612, 616, 620, and 624. Example printouts upon exit are shown at 606, 610, 614, 618, 622, and 626.

Figure 7:
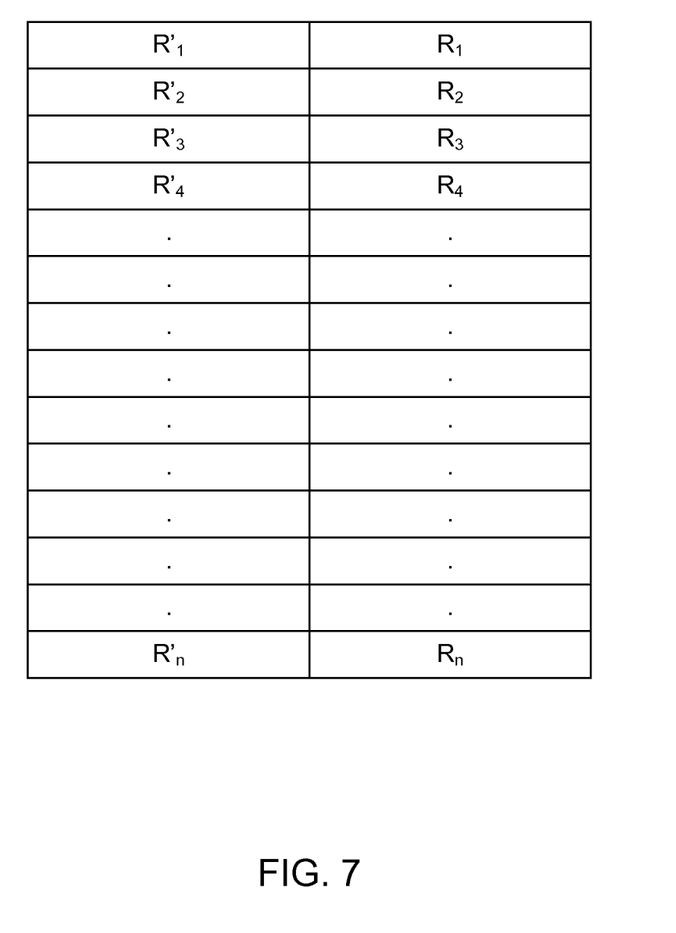
FIG. 7 is a diagram illustrating a data structure for storing mutated return addresses and linking them to the actual return address.

In some embodiments, a data structure may be used for storing mutated return addresses and linking them to the actual return address. FIG. 7 is a diagram illustrating an example of such a data structure. As is well understood in the field of computer science, the data structure could be implemented as a hash table that maps the mutated return address to the actual return address and to the subroutine, or by using one of a variety of other data structures. When a data structure such as that illustrated in FIG. 7 is used, step 504 of FIG. 5 in which the exception handler determines if the invalid instruction pointer R' is recognizable may include searching the data structure to determine if the data structure contains R'. Step 508, the step of determining the actual value for the return address, may include finding the R with which R' is associated.

In some embodiments, a function "f" may be used to mutate the return address R into an invalid instruction pointer R,' as notated by $f(R)=R'$. If the function f is reversible, i.e., if there is another function, such that $f^{-1}(R')=R$, then there will be no need to store R in memory once it has been mutated. R can be determined by applying $f^{-1}$ to R'. $f^{-1}$ is referred to as the inverse of f.

There are certain requirements for a function to be reversible, as is well understood in the field of computer science. For every possible return address R, there must be a mutated return address R' which is an invalid instruction pointer such that $f(R)=R'$. Additionally, for every return address R, there must be only one mutated return address/invalid instruction pointer such that $f(R)=R'$. In other words, if $f(R)=R1'$, $f(R)$ cannot also equal R2' unless R1=R2. Additionally for every mutated return address R', there must be only one return address such that $f^{-1}(R')=R$. This is referred to as being one-to-one.

Figure 8A:
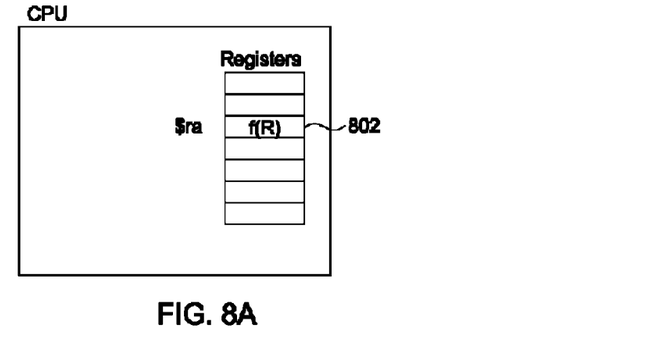
FIG. 8A is a diagram illustrating saving a mutated return address which has been mutated by a function f(R) in the $ra register in the MIPS architecture.

When using a reversible function to mutate the return address, step 302 of FIG. 3 is performed by determining f(R) and storing f(R) in the architecture reserved space for storing the return addresses. For example, as illustrated at 802 of FIG. 8A, f(R) would be stored in the $ra register in the MIPS architecture. As illustrated at 804 of FIG. 8B, f(R) would be stored on the stack in the x86 architecture, and other architectures using a stack. Again, these examples are illustrative, and are not meant to be limiting in any way.

As described above, with regard to FIG. 3 at 306, once the subroutine has finished processing, and the machine attempts to jump to the instruction at f(R), there will be a fault because f(R) is an invalid instruction pointer. The exception handler for handling that fault is then called as illustrated at 308 of FIG. 3. As illustrated at step 504 of FIG. 5, the exception handler will first determine if the invalid instruction pointer is recognizable as the type of invalid instruction pointer caused by mutating the return address by applying f(R) in step 302 of FIG. 3. When a function is used to mutate the return address, this step may be performed without needing any extra memory for storing the mutated return addresses, such as the data structure illustrated in FIG. 7. If the invalid instruction pointer is recognizable, the exception handler instruments the exit of the subroutine. Once the exception handler is finished instrumenting the code at 506 of FIG. 5, step 508, determining the actual return address, is performed by applying the inverse function to f(R), i.e., $f^{-1}(f(R))$ which will return the value of R. The value of R is then stored in the architecture reserved space for storing the return address and control returns to the caller.

When using a reversible function, because the actual return address may be determined without needing to be stored and because the mutated return address is stored in the architecture reserved space for the return address, no additional memory space, such as space for a data structure as illustrated in FIG. 7 is needed. Additionally, there is no need to search for the return address in the data structure because it can be computed using the function. Because using a reversible function to mutate the return address provides for instrumenting code in constant time and space, embodiments using reversible functions to mutate return addresses can be used to instrument very low-level kernel routines, such as memory allocating and synchronization primitives.

In some embodiments using the x86-64 instruction set, step 302 of FIG. 3, i.e., mutating the return address, may be implemented by a function that flips bit 63 of the address. Flipping a bit refers to changing a bit with value 1 to 0, and changing a bit with value 0 to 1. The x86-64 architecture requires that valid instruction pointers have "canonical" addresses, meaning that all addresses must have the same values in bit 63 through the most significant implemented bit. The least significant bit in a computer address is referred to as bit 0, and thus the 64th bit is referred to as bit 63. The highest implemented bit is the highest bit that has meaning. The function f, defined as flipping the left most bit is reversible because every address will have a mutated return address and for any address, there is only one possible number that will result from flipping the left most bit. The inverse is the function itself. Because bits can only have the value 0 or 1, flipping a bit twice will result in the original value, and thus $f^{-1}(f(R))=R$, examples of which are illustrated in Table 5.

In many currently implemented x86-64 architectures, bit 47 is the most significant implemented bit. This means that bits 0-47 can contain useful information, but bits 48-63 have to be the same in every address. For example, canonical addresses in the x86-64 architecture may be implemented by the rule that bits 48 through 63 of the virtual address must be copies of bit 47. Under this rule, the addresses illustrated in Table 3 would be canonical addresses and thus, return addresses including these numbers would be valid instruction pointers:

TABLE 3

Example Return Address R

| bits 48-63 | bits 0-47 |
|---|---|
| 1111111111111111 | 1001000010000100000000000000000000010010100001000000010 |
| 0000000000000000 | 0100101010101010100010101010101010100101010101010101 |
| 1111111111111111 | 110111110111111111111111111111101111111111111111111 |

Table 4, illustrates the mutated return addresses for the addresses illustrated in Table 3 as determined by applying f(R) where f is a function which flips bit 63. These addresses would be invalid instruction pointers.

TABLE 4

Example Mutated Return Addresses f(R)

| bits 48-63 | bits 0-47 |
|---|---|
| 0111111111111111 | 1001000010000100000000000000000000010010100001000000010 |
| 1000000000000000 | 0100101010101010100010101010101010100101010101010101 |
| 0111111111111111 | 110111110111111111111111111111101111111111111111111 |

Figure 8B:
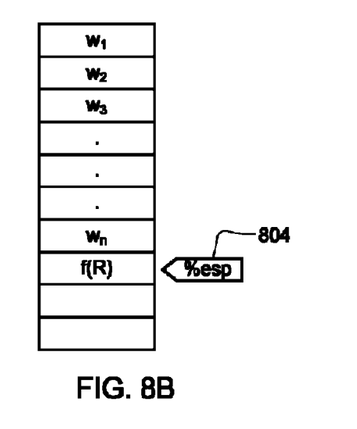
FIG. 8B is a diagram illustrating saving a mutated return address which has been mutated by a function f(R) on the stack.
Figure 8C:
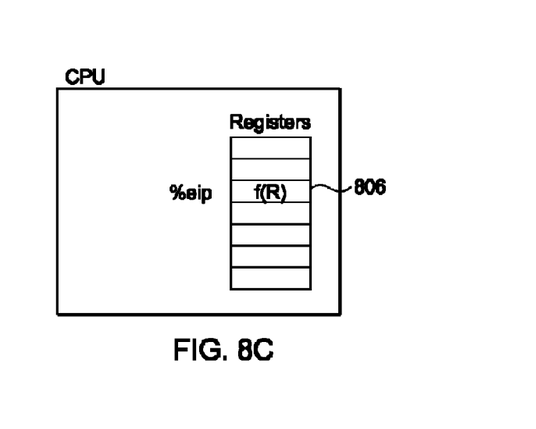
FIG. 8C is a diagram illustrating the program counter register in the x86 architecture with the return address mutated by the function f(R)

In embodiments using this function, in step 304 of FIG. 3 a mutated return address f(R) with the 63rd bit flipped is stored in the top of the stack, 804 of FIG. 8B. As described above, once the subroutine has finished processing, and the machine attempts to jump to the instruction at f(R) at step 306 of FIG. 3, there is a fault because f(R) is an invalid instruction pointer. The exception handler for handling that fault is called at step 308 of FIG. 3. At 504 of FIG. 5, the exception handler analyzes f(R) to ensure that it is recognizable as a mutated return addresses created by the function. If it is a recognizable mutated return address, the exception handler instruments the return from the subroutine at 506 of FIG. 5.

Once the exception handler is finished instrumenting the code, step 508 of FIG. 5 is performed by applying the inverse function to f(R), i.e., $f^{-1}(f(R))$ which will return the value of R. Examples are illustrated in table 5. The actual return address R is then stored in the architecture reserved space for return address step 510 of FIG. 5, and the exception hander exits. Control then returns to the caller at step 312 of FIG. 3.

TABLE 5

Example $f^{-1}$ (f(R )) = R.

| bits 48-63 | bits 0-47 |
|---|---|
| 1111111111111111|1001000010000100000000000000000000010010100001000000010 |
| 0000000000000000|0100101010101010100010101010101010101001010101010101 |
| 1111111111111111|1101111110111111111111111111111011111111111111111111 |

These examples are meant to be illustrative, and are not meant to be limiting in any way. Canonical addresses are well understood in the field of computer science and using a function that flips the 63rd bit would be understood to apply to any architecture that includes canonical addresses in which the 63rd through the left most significant bit must be the same in every address. How to implement such a function is also well understood in the field.

In some embodiments using RISC architectures, such as MIPS, PowerPC, and SPARC, mutating the return address, step 302 of FIG. 3, may be implemented by a function that flips the right most bit of the address. As discussed above, the address of an instruction is the location in memory of the instruction. RISC architectures require that instructions be aligned in memory at 4-byte addresses, and thus valid addresses occur at set intervals. If the lowest bit of a valid instruction pointer is flipped, then the mutated address will be an invalid instruction pointer. Flipping the lowest bit of an address is a reversible function because every address will have a mutated return address and for any address, there is only one possible number that will result from flipping the right most bit. The inverse is the function itself. As discussed above, because bits can only have the value 0 or 1, flipping a bit twice will result in the original value. Thus, in embodiments using this function to mutate the return address, f(R), which is the return address with the right most bit flipped will be stored in the $ra register as shown at 802 of FIG. 8A. Step 508 of FIG. 5, determining the actual return address once the subroutine exit has been instrumented, will be performed by again flipping the right most bit of the mutated return address.

Figure 9:
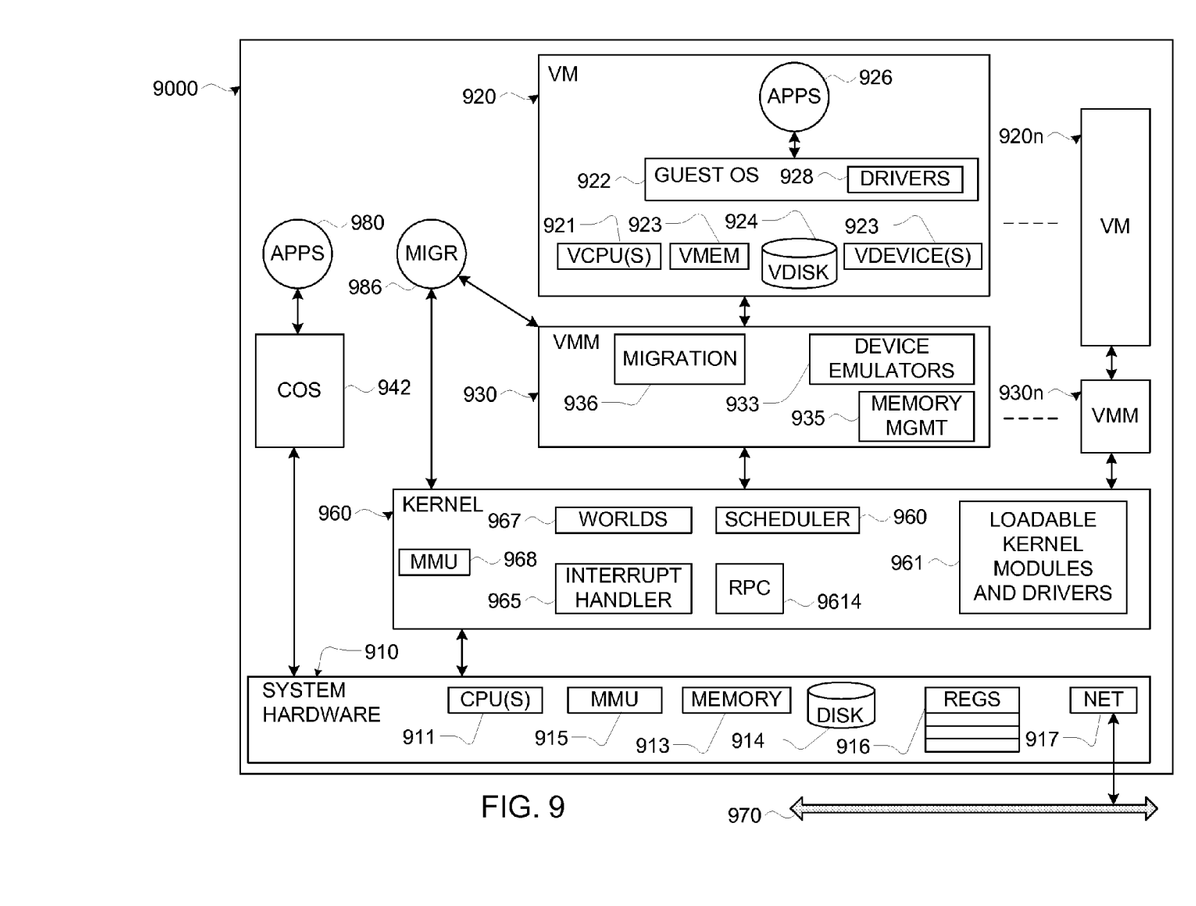
FIG. 9 is a diagram illustrating the general configuration of a virtualized computer system.

In some embodiments, the "controlling" program will be implemented at a virtualization layer, such as a virtual machine monitor. As is well known in the field of computer science, a virtual machine (VM) is a software abstraction—a "virtualization"—of an actual physical computer system. FIG. 9 illustrates, in part, the general configuration of a virtual machine 920, which is installed as a "guest" on a "host" hardware platform 910.

As FIG. 9 shows, the hardware platform 910 includes one or more processors (CPU's) 911, system memory 913, and a storage device, which will typically be a disk 914. The system memory will typically be some form of high-speed RAM, whereas the disk (one or more) will typically be a non-volatile, mass storage device. The hardware 910 will also include other conventional mechanisms such as a memory management unit MMU 915, various registers 916, and any conventional network connection device 917 (such as a network adapter or network interface card—"NIC") for transfer of data between the various components of the system and a network 970, which may be any known public or proprietary local or wide-area network such as the Internet, an internal enterprise network, etc.

Each VM 920 will typically include at least one virtual CPU 921, a virtual disk 924, a virtual system memory 923, a guest operating system (which may simply be a copy of a conventional operating system) 922, and various virtual devices 923, in which case the guest operating system ("guest OS") will include corresponding drivers 928. All of the components of the VM may be implemented in software using known techniques to emulate the corresponding components of an actual computer.

In some embodiments, if the VM is properly designed, then it will not be apparent to the user that any applications 926 running within the VM are running indirectly, that is, via the guest OS and virtual processor. Applications 926 running within the VM will act just as they would if run on a "real" computer, except for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), illustrated as component 930. A VMM is usually a thin piece of software that runs directly on top of a host, or directly on the hardware, and virtualizes all the resources of the machine. More generally, the interface between a VM and the underlying host platform may be referred to as virtualization software or virtualization logic. Among other components, the VMM therefore usually includes device emulators 933, which may constitute the virtual devices (923) that the VM 920 addresses. The interface exported to the VM may be the same as the hardware interface of the machine, so that the guest OS cannot determine the presence of the VMM. The VMM also usually tracks and either forwards (to some form of operating system) or itself schedules and handles all requests by its VM for machine resources, as well as various faults and interrupts.

Although the VM (and thus the user of applications running in the VM) cannot usually detect the presence of the VMM, the VMM and the VM may be viewed as together forming a single virtual computer. They are illustrated in FIG. 9 as separate components for the sake of clarity.

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations of behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 9 illustrates a kernel 960 that serves as the system software for several VM/VMM pairs 920/930, . . . , 920n/930n.

Because the virtual layer can monitor the guest operating system, implementing the controlling program in the virtualization layer allows for determining what is happening in the guest operating system at a level that is not possible when the guest operating system is being run natively. Further, using the virtual machine monitor to monitor code allows for instrumentation code to be written which can be applied to different operating systems. Various issued patents and published patent applications assigned to the assignee of this patent, VMware, Inc., describe various aspects of virtualization systems that can be used in implementing embodiments of this invention in a virtualized computer system.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for instrumenting code comprising a processor and a memory coupled with the processor, wherein the memory is configured to provide the processor with instructions for:
   trapping entry to a subroutine;
   applying a function to the subroutine's return address such that the subroutine's return address becomes mutated with an invalid instruction pointer;
   storing the mutated return address in an architecture reserved space in place of storing the return address in the architecture reserved space;
   executing an exception handler that has been instrumented to handle a fault caused by the mutated return address such that an exit from the subroutine is instrumented; and
   upon executing the exception handler, determining the return address from the mutated return address.

2. The system of claim 1, wherein the function is a reversible function and the step of determining the return address comprises using the function's inverse.

3. The system of claim 2, wherein return address is a canonical address and wherein the function comprises flipping the left most bit of a canonical return address.

4. The system of claim 2 wherein the return address is aligned with other return address at specific boundaries in memory and wherein the function comprises flipping the right most bit of a return address wherein.

5. The system of claim 1 in which the step of instrumenting the exit from the subroutine further comprises outputting information about the subroutine in human viewable form.

6. The system of claim 1 wherein a controlling program is implemented in a virtualization layer.

7. The system of claim 2, wherein the subroutine is a low-level kernel routine.

8. The system of claim 2, wherein the subroutine is a memory allocating routine.

9. They system of claim 2, wherein the subroutine is a synchronization primitives routine.

10. The system of claim 1 wherein the exception handler has been further instrumented to determine the actual return address of the subroutine, and store the actual return address in the architecture reserved space for the return address.

11. The system of claim 1 wherein mutating the subroutine's return address comprises altering a portion of the subroutine's return address.

12. A method for instrumenting code comprising:
   at a processor, trapping entry to a subroutine;
   applying a function to the subroutine's return address such that the subroutine's return address becomes mutated with an invalid instruction pointer;
   storing the mutated return address in an architecture reserved space in place of storing the return address in the architecture reserved space;
   executing an exception handler that has been instrumented to handle a fault caused by the mutated return address such that an exit from the subroutine is instrumented; and
   upon executing the exception handler, determining the return address from the mutated return address.

13. The method of claim 12, wherein the function is a reversible function, and wherein determining the return address comprises using the function's inverse.

14. The method of claim 12, wherein executing an exception handler that has been instrumented to handle a fault caused by the mutated return address such that the exit from the subroutine is instrumented further comprises:
   determining if the invalid instruction pointer corresponds to the mutated subroutine's return address; and
   if it is determined the invalid instruction pointer corresponds to the mutated subroutine's return address, instrumenting a return from the subroutine.

15. The method of claim 14, wherein the exception handler instruments a return from the subroutine by running a required instrumentation code.

16. The method of claim 14, once a return from the subroutine has been instrumented, determining, by the exception handler, an actual return address for the subroutine.

17. The method of claim 16, further comprising placing the actual return address in an architecture reserved space for return addresses.

18. A computer program product for instrumenting code, the computer program product being embodied in a non-transitory computer readable storage medium and comprising computer instructions for:
   trapping entry to a subroutine;
   applying a function to the subroutine's return address such that the subroutine's return address becomes mutated with an invalid instruction pointer;
   storing the mutated return address in an architecture reserved space in place of storing the return address in the architecture reserved space;

executing an exception handler that has been instrumented to handle a fault caused by the mutated return address such that an exit from the subroutine is instrumented; and upon executing the exception handler, determining the return address from the mutated return address.

19. The computer program product of claim 18, wherein the function is a reversible function, and wherein determining the return address comprises using the function's inverse.

* * * * *